United States Patent
Yeh et al.

(10) Patent No.: US 7,542,608 B2
(45) Date of Patent: Jun. 2, 2009

(54) METHOD FOR AUTOMATICALLY CROPPING IMAGE OBJECTS

(75) Inventors: Chi-Ping Yeh, Taipei (TW);
Chih-Tsung Chiang, Taipei (TW)

(73) Assignee: Newsoft Technology Corporation, Taipei (TW)

( * ) Notice: Subject to any disclaimer, the term of this patent is extended or adjusted under 35 U.S.C. 154(b) by 617 days.

(21) Appl. No.: 11/237,680

(22) Filed: Sep. 29, 2005

(65) Prior Publication Data
US 2006/0228044 A1  Oct. 12, 2006

(30) Foreign Application Priority Data
Apr. 12, 2005  (TW) .............................. 94111552 A (51) Int. Cl.
*G06K 9/48* (2006.01)
*G06K 9/34* (2006.01)
(52) U.S. Cl. ...................... 382/199; 382/173
(58) Field of Classification Search .............. 382/180, 382/173, 282, 284, 289, 199
See application file for complete search history.

(56) References Cited

U.S. PATENT DOCUMENTS

| 5,056,154 A | * | 10/1991 | Aono et al. ................. 382/246 |
| 7,305,131 B2 | * | 12/2007 | Yen et al. .................... 382/218 |
| 2002/0191861 A1 | * | 12/2002 | Cheatle ...................... 382/282 |

* cited by examiner

*Primary Examiner*—Matthew C Bella
*Assistant Examiner*—Randolph Chu
(74) *Attorney, Agent, or Firm*—Birch, Stewart, Kolasch & Birch, LLP (57) ABSTRACT

A method for automatically cropping image objects, including: an object contour detecting step, an image dividing step, and an image merging step. The object contour detecting step detects object contours with Modified Laplacian Contour Detector to generate a binary image. The image dividing step divides the binary image into a background region and a plurality of non-background regions with Connected Components Algorithm (CCA). The image merging step merges the closer non-background regions from large to small, and determines whether the merging is reasonable for cropping the image object.

5 Claims, 6 Drawing Sheets

METHOD FOR AUTOMATICALLY CROPPING IMAGE OBJECTS

BACKGROUND

1. Field of the Invention

The invention relates to a method for processing images, and more particularly, to a method for automatically cropping image objects.

2. Description of the Related Art

Scanners have which been popularly used in modem lives are important tools for companies to arrange documents or for individuals to organize cards and photographs. However, the scanners today still have a big problem in cropping image objects (like scanned photographs, documents, cards and more); that is, a majority of scanner drivers or scanner software cannot automatically crop a plurality of image objects, and only provide single image object cropping function.

Take photographs as an example, if an user has six photographs to be scanned and archived, the system cannot automatically crop the six photographs into six complete picture files if the six photographs were scanned at once (for example, put six photographs on one A4 paper), rather, the system can only illustrate the six photographs together as a whole. In order to have the six pictures in complete and independent form, the user has to either manually crop each photograph, or scan the six photographs one at a time; both methods are time-consuming and troublesome.

In other words, the conventional scanner software is only able to automatically crop a single image object or allow users to manually crop a plurality of image objects, and the single image object has to be defined to have a rectangular or quadrangular shape, which is an enclosed area made of four points or four straight lines.

In addition, there are more disadvantages to conventional auto-cropping methods, one of which is that when the color of image object is close to the background color, the determination of the edges of the image object may be erroneous, thereby the size or content of the cropped image object are different from that of the original image object. Another disadvantage is that the method does not automatically make a correction when the angle of the image is tilted, and therefore the user often has to manually adjust the angle after cropping, which is very inconvenient.

Thus, a new image object processing method is needed to solve the above problems.

SUMMARY OF THE INVENTION

An object of the invention is to provide a method for automatically cropping image objects which is capable of cropping a plurality of image objects automatically.

Another object of the invention is to provide a method for automatically cropping image objects which is capable of distinguishing the area covered by the image objects clearly without making errors when the color difference between the image objects and the background is small.

Another object of the invention is to provide a method for automatically cropping image objects that can automatically correct the angle of which the image object has been tilted from scanning.

In order to achieve the aforementioned objects, the invention provides a method for automatically cropping image objects, including: an object contour detecting step for detecting image object contour with Modified Laplacian Contour Detector to generate a binary image; an image dividing step for dividing the binary image into a background region and a plurality of non-background regions with Connected Components Algorithm (CCA); and an image merging step for merging the closer non-background regions from large to small and determining if the merging of the regions is reasonable for cropping the image object.

The aforementioned object contour detecting step includes the following sub-steps: (1) for each pixel point, subtracting the grayscale value of 8 adjacent pixel points from the grayscale value of the pixel point to obtain the differences between the grayscale values of the pixel point and the 8 adjacent pixel points; (2) according to the differences calculated from the previous step, adding up all the positive differences to obtain the sum of positive differences, and adding up all the negative differences to obtain the sum of negative differences; (3) adjusting the grayscale value of the pixel point, such that its sign is the same as that of the one having a larger absolute value among the sum of positive differences and the sum of negative differences and its magnitude equals to the sum of the absolute values of the sum of positive differences and the sum of negative differences.

The aforementioned image merging step includes the following sub-steps: a first merging step for respectively merging the non-background regions whose distance between each other is smaller than a predetermined critical value into first groups; and a second merging step for respectively merging the closer first groups, from large to small, into second groups.

The aforementioned image merging step further includes a step for determining whether the second groups are image objects.

The second merging step mentioned above further includes the following sub-steps: (a) labeling each first group as unprocessed; (b) selecting a largest first group to be a third group; (c) selecting another unprocessed first group to be a fourth group; (d) merging the third group and the fourth group; (e) executing a determination step to determine the reasonability of the merging of the third group and the fourth group; (f) if the merging is reasonable, merge the fourth group with the third group and delete the fourth group, and then return to step (c); if the merging is unreasonable, return directly to step (c); (g) labeling the third group as processed, and returning to step (b) until every first group has been processed.

The determination step (e) in the previous paragraph includes the following sub-steps: merging the third group with the fourth group to form a fifth group; rotating the coordinate axis and projecting the fifth group with respect to the axis; obtaining an optimal rotation angle from different rotation angles and a smallest rectangle, and if the length and width of the rectangle are not coincident with predetermined length and width, the merging of the third group and fourth group is unreasonable.

The invention further discloses a method for correcting rotation angle of image objects, including: rotating axis using different rotation angles and projecting an image object with respect to the axis; obtaining an optimal rotation angle from the different rotation angles and a smallest rectangle, wherein the optimal rotation angle is the rotation angle of the image object.

Through the method mentioned above, not only can a plurality of image objects be automatically cropped, but different background colors can also be used without adopting a background whose color is significantly different from the image object, as in the past. Moreover, even if the image object is oblique, it can be corrected. Hence, the invention has lots of advantages and makes breakthroughs in this art to be deemed as a pioneer in this field.

DETAILED DESCRIPTION OF THE INVENTION

The preferred embodiments of the invention will be described below with reference to the drawings.

Figure 1A:
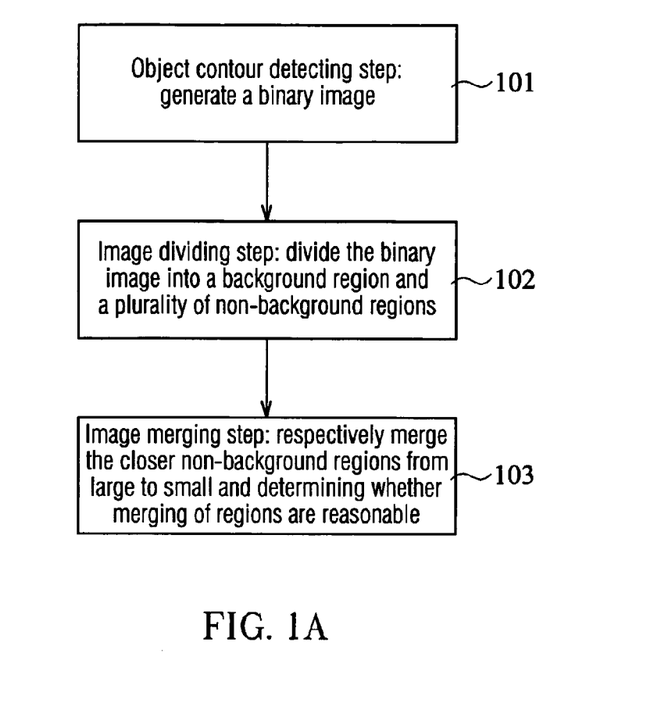
FIG. 1A is a flow chart illustrating a method for automatically cropping image objects according to a preferred embodiment of the invention.
Figure 1B:
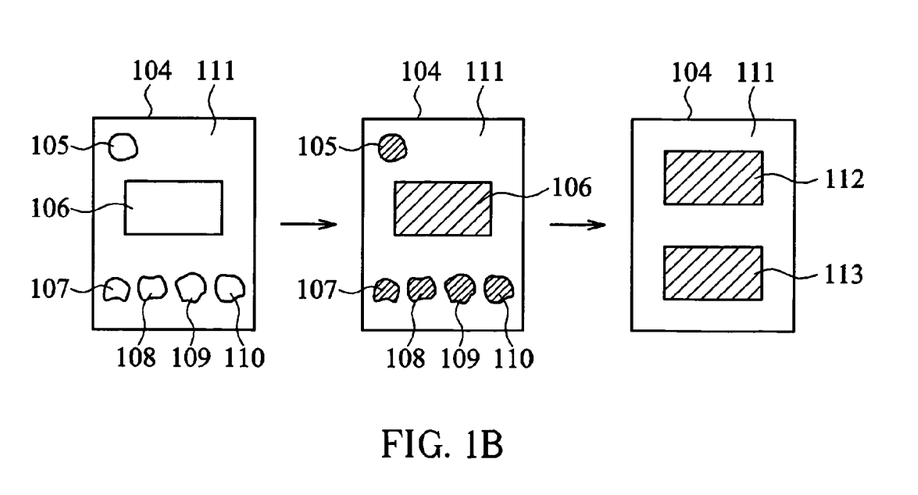
FIG 1B is a schematic diagram illustrating a method for automatically cropping image objects according to a preferred embodiment of the invention.

FIGS. 1A and 1B disclose preferred embodiments of the method for automatically cropping image objects according to the invention. As shown in FIG. 1A, the method for automatically cropping image objects of the invention includes: an object contour detecting step 101, an image dividing step 102, and an image merging step 103. The object contour detecting step 101 detects the contour of image object with Modified Laplacian Contour Detector to generate a binary image. The image dividing step 102 divides the binary image into a background region and a plurality of non-background regions with Connected Components Algorithm (CCA). The image merging step 103 merges the closer non-background regions from the largest to the smallest, and determines the reasonability of the merging for cropping the image object.

FIG. 1B illustrates the above steps by figuration; as shown in this figure, an image 104 includes a plurality of regions 105-111. In the object contour detecting step 101, the plurality of regions 105-111 are represented in a binary form, and in the image dividing step 102, the regions 105-110 are defined as non-background regions and the region 111 is defined as a background region. Next, as a result of the image merging step 103, the non-background regions 105-110 are merged into groups and the reasonability of these merging processes are determined. After all of the non-background regions are reasonably merged, the correct image can be obtained. In this example, the regions 105 and 106, which merged to be groups 105 and 106, are merged into a group 112 that is determined to be an image object coincident with its original image object, and the regions 107-110, which merged to be groups 107-110, are merged into a group 113 that is determined to be an image object coincident with its original image object.

The aforementioned object contour detecting step 101, the image dividing step 102, and the image merging step 103 will be described in more detail with reference to the drawings; please refer alternately between the drawings being referred to hereafter and FIGS. 1A and 1B to better understand the technical features of the invention.

Figure 2:
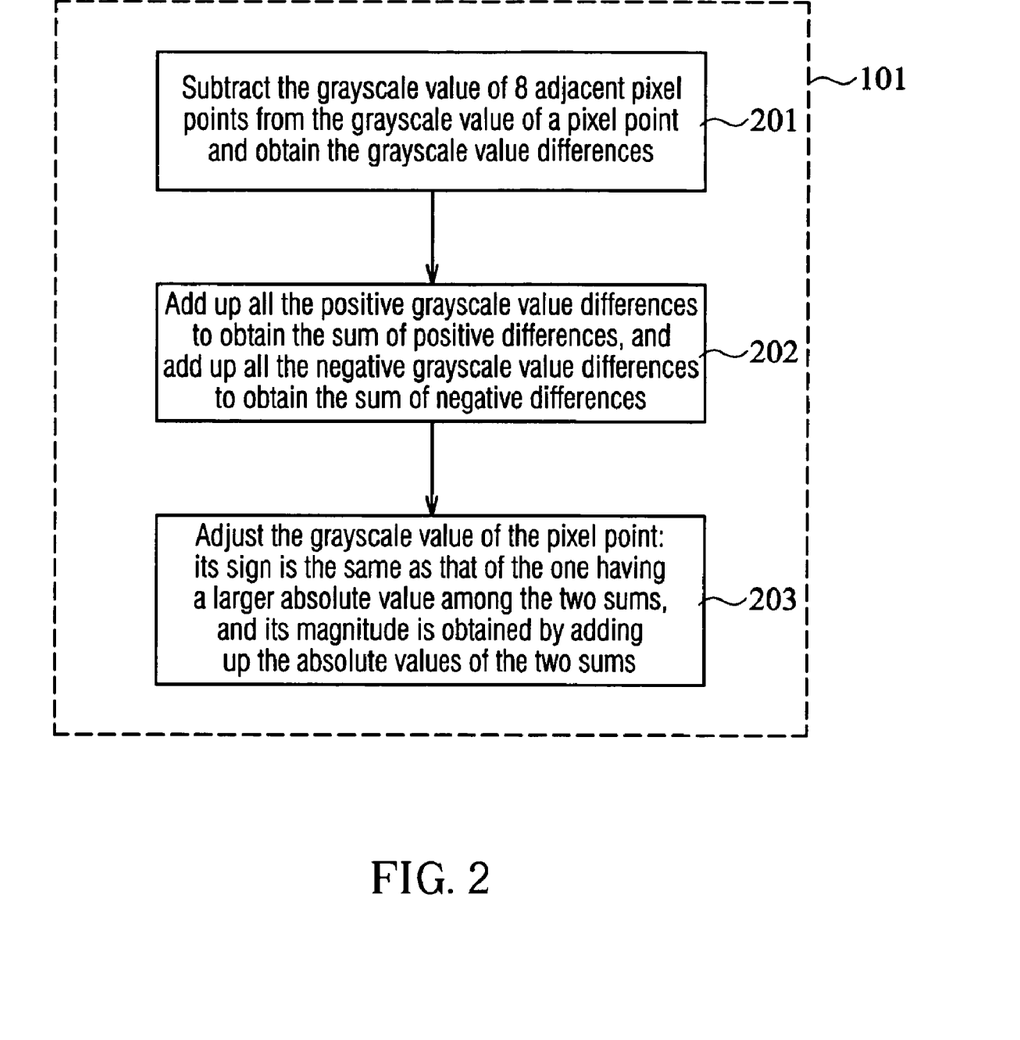
FIG. 2 is a flow chart illustrating an object contour detecting step according to a preferred embodiment of the invention.

FIG. 2 discloses the flow chart of the object contour detecting step 101 according to a preferred embodiment of the invention. As shown in FIG. 2, the object contour detecting step 101 includes: step 201, for each pixel point, subtracting the grayscale value of eight adjacent pixel points from the grayscale of the pixel point to obtain the differences between the grayscale values of the pixel point and the eight pixel points; step 202, according to the differences calculated from the previous step, adding up all the differences that are positive to obtain the sum of positive differences and adding up all the differences that are negative to obtain the sum of negative differences; and step 203, adjusting the grayscale value of the pixel point, such that its sign is the type of differences with the greater absolute value among the sum of positive differences and the sum of negative differences, and its magnitude is adding up the absolute values of the sum of positive differences and the sum of negative differences. An objective of the object contour detecting step 101 is to strengthen the edges of image contour so that it can be easily discriminated.

Figure 3:
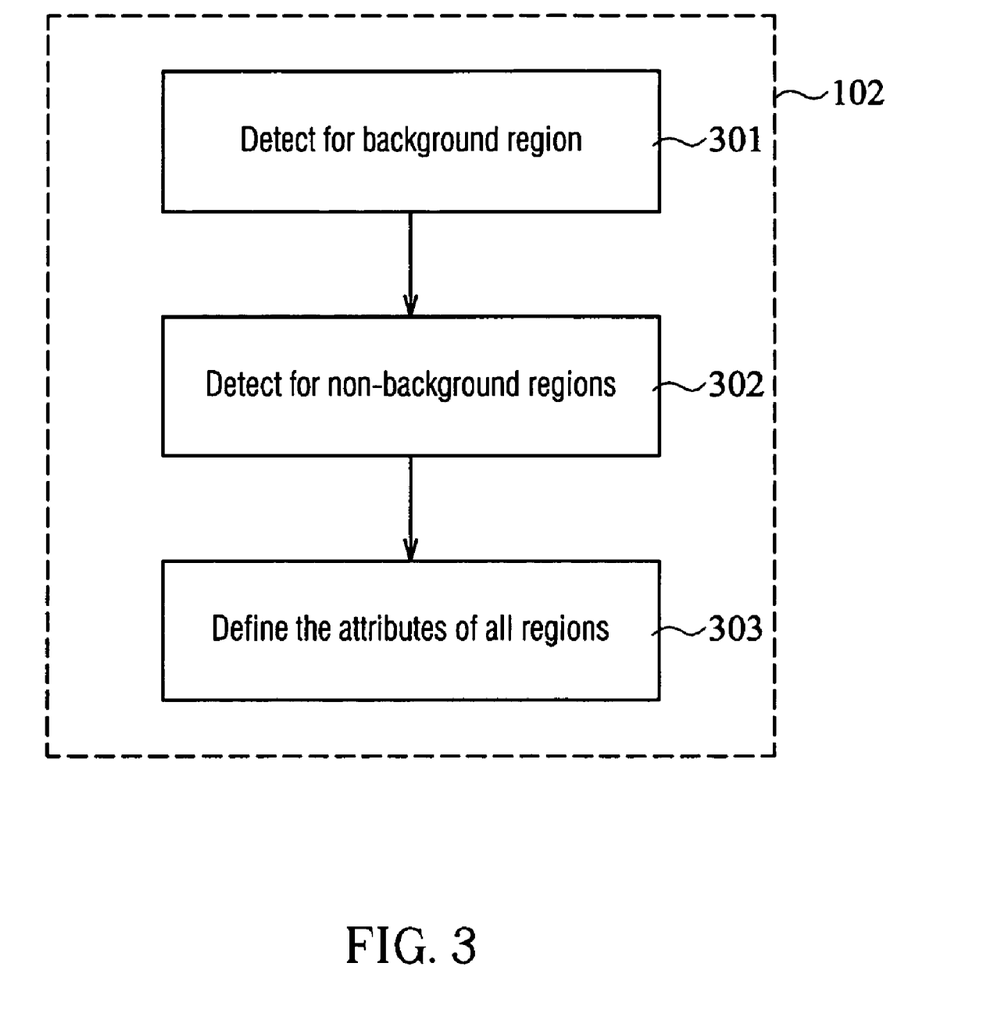
FIG. 3 is a flow chart illustrating an image diving step according to a preferred embodiment of the invention.

FIG. 3 illustrates the detailed steps of the image dividing step 102, including: step 301, step 302, and step 303. In step 301, detection for background region is carried out, that is, the plurality of regions in FIG. 1B is detected and the region 111 is detected to be a background region. In step 302, detection for non-background region is carried out, that is, the non-background parts of the plurality of regions in FIG. 1B is detected; in this step, the regions 105-110 are detected to be non-background regions. In step 303, the detected background region and non-background regions are defined. It is to be noted that since CCA used in the image dividing step 102 is a conventional technology, its working and principles are omitted here.

Figure 4A:
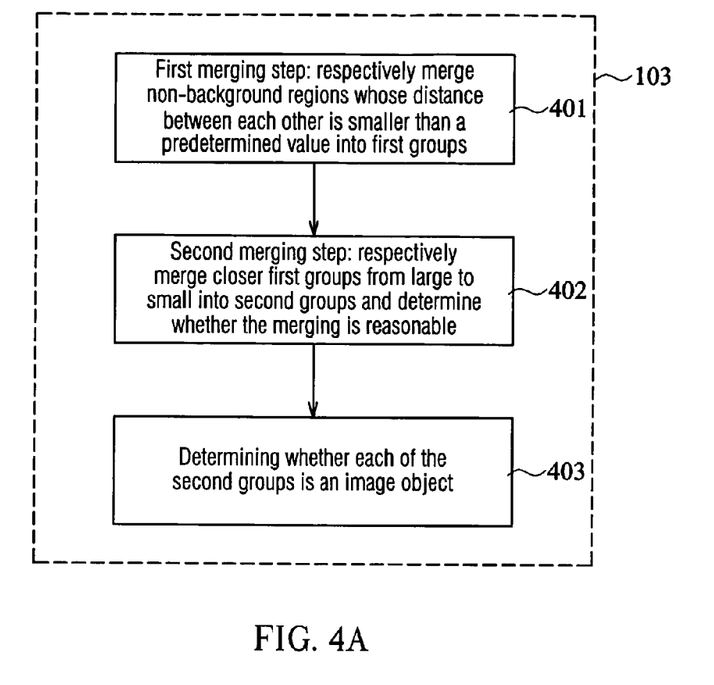
FIG. 4A is a flow chart illustrating an image merging step according to a preferred embodiment of the invention.

FIG. 4A illustrates the detailed steps of the image merging step 103. These detailed steps include: a first merging step 401, respectively merging non-background regions whose distance from each other is smaller than a predetermined critical value into first groups; a second merging step 402, from the largest to the smallest, respectively merging one first group with other closer first groups into second groups and determining the reasonability of the merging processes, and repeating the second merging step 402 until all of the first groups are reasonably merged. The principles of the aforementioned first merging step 401 and second merging step 402 will be described below.

Besides the first merging step 401 and second merging step 402, person skilled in the art may include a step 403 in the image merging step 103 to determine whether the second groups are image objects.

Figure 4B:
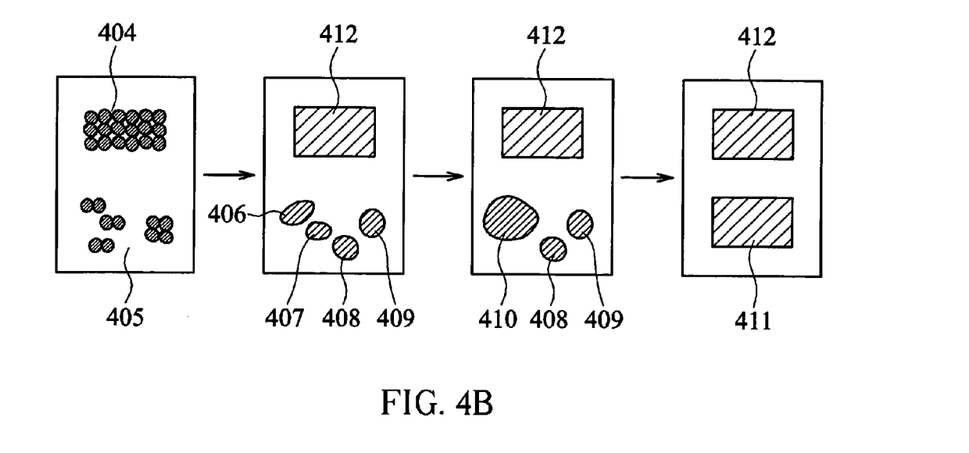
FIG. 4B is a schematic diagram illustrating an image merging step according to a preferred embodiment of the invention.

FIG. 4B illustrates the effect of aforementioned steps 401-403 by figuration. As shown in this figure, an image group 404 and an image group 405 are image objects of scanned pictures. However, the regions of the image group 404 are more condensed and that of the image group 405 are more dispersed. Therefore, in the first merging step 401, the regions in the image group 404 are merged into a first group 412, whereas the regions in the image group 405 are merged into a plurality of first groups 406-409.

In the second merging step 402, the first groups 406-409 and 412 tried to merge together and the reasonability of the merging processes is determined. This part of the merging process is performed from the largest group to the smallest group and is determined whether or not it's reasonable. The principles of the merging process and reasonability determination will be described below in detail. In this example, the merging of the first group 412 with other first groups are determined to be unreasonable, because the first group 412 itself is a complete image object (such as a picture or a card), and therefore it is labeled as processed and remains without further changes. Next, the first groups 406 and 407 are merged into a second group 410, which in turn proceeds to merge with the first groups 408 and 409. The process is repeated until each of the first groups is reasonably merged. At last, a complete second group 411 and the first group 412 (now as a second group) are generated which are desirably the complete objects for the user. Then, in step 403, each of the second groups is determined to be an image object or not.

Figure 5:
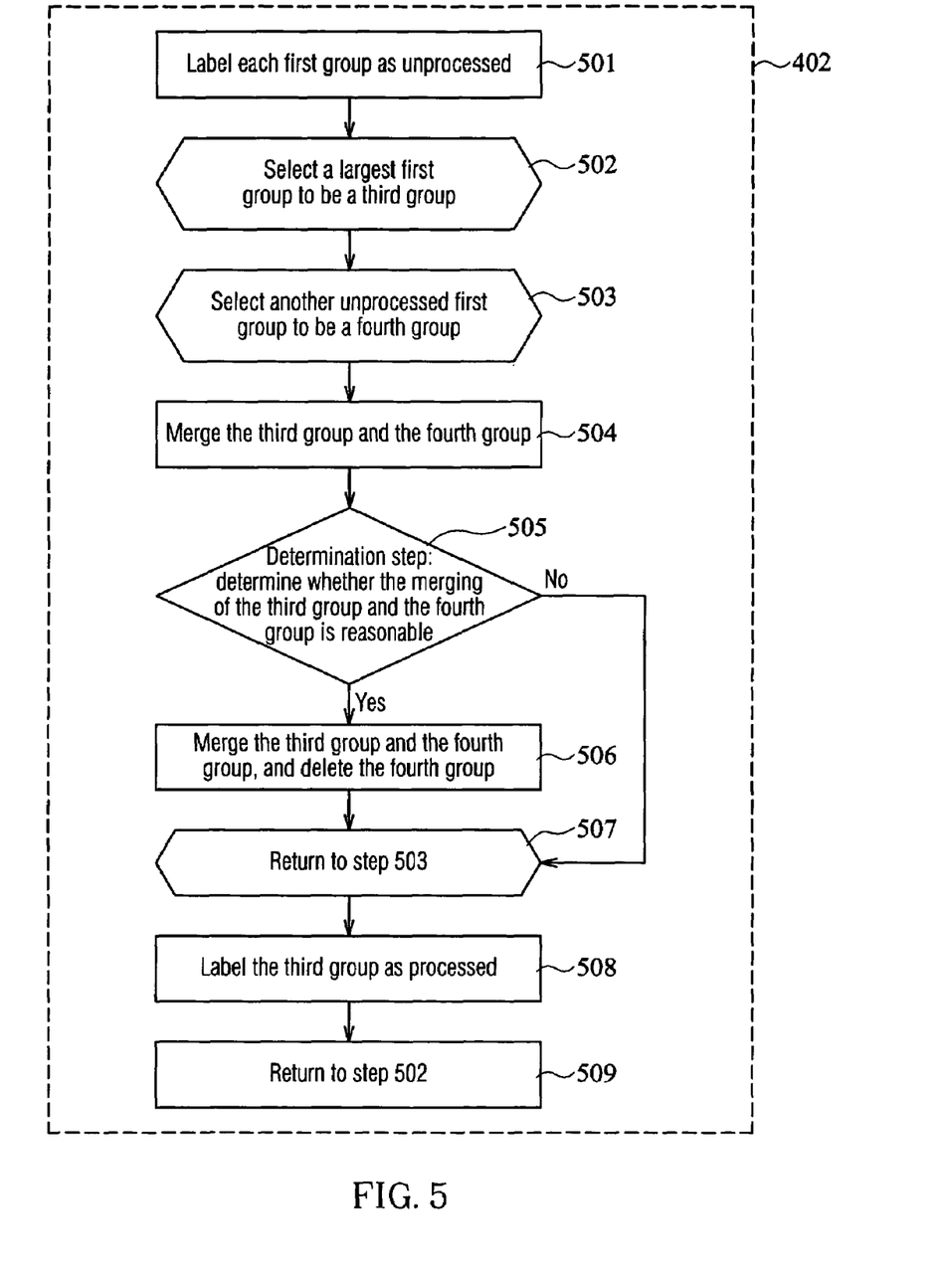
FIG. 5 is a flow chart illustrating a second merging step according to a preferred embodiment of the invention.

FIG. 5 illustrates the flow chart of the second merging step 402 according to a preferred embodiment of the invention; refer alternately between FIGS. 4B and 5 to better understand the invention.

In step 501, each first group, including the first groups 406-409 and 412 in FIG. 4B, is labeled as unprocessed. In step 502, a largest first group is selected as a third group. In step 503, another first group is selected from other unprocessed first groups as a fourth group. In the example illustrated in FIG. 4B, the first group 412 is selected to be the third group and the first group 406 is selected to be the fourth group.

Then in step 504, the third group 412 and the fourth group 406 are merged. Subsequently, in the determination step 505, the merging of the third group 412 and the fourth group 406 is determined to be reasonable or not. If the merging is reasonable, proceed to step 506, where the fourth group 406 is merged with the third group 412 into a second group, and the fourth group 406 is deleted; then proceed to step 507, which will return to step 503. On the other hand, if the merging is unreasonable, proceed directly to step 507 from step 505, which will return to step 503. This cycle continues until the merging of the third group 412 with all other first groups have been tried. Then proceed to step 508, in which the third group 412 is labeled as processed, and then go back to step 502, until every first group is processed.

In short, in the example illustrated in FIG. 4B, the largest first group 412 is first selected as a third group, and then one of the other first groups 406-409 (for example, the first group 406) is selected as a fourth group and is merged with the third group 412 to be a fifth group. Next, the reasonability of the merging of the third group 412 and the fourth group 406 is determined. If the merging is reasonable, the fourth group 406 is merged with the third group 412, and one of the remaining first groups 407-409 is selected to be the fourth group and is merged with the third group 412 to be the fifth group. If the merging is unreasonable, the fourth group 406 stays still while another first group is selected from the remaining first groups 407-409 to be the fourth group and is merged with the third group 412. After the first group 412, served as the third group, has tried to merge sequentially with every one of the first groups 406-409, the first group 412 is labeled as processed. Then, one first group is selected from the first groups 406-409 to be a third group and the same merging and determination steps as mentioned above are executed.

In this example, due to that the merging of the third group 412 and all other first groups are unreasonable, the third group 412 remains unchanged. The second largest first group 406 is then selected to be a third group, which is to merge with the first group 407 that is selected as a fourth group. The merging is determined to be reasonable, and thus the fourth group 407 and the third group 406 are merged into a second group 410. The second group 410 is used as the third group and tried to merge with the first group 408. The above steps are repeated until every one of the first groups is reasonably merged to be a second group. The steps and principle of determining the reasonability of merging are described below.

The main objective of the second merging step 402 is to compensate for image objects that were not properly scanned so as to form complete image objects. As mentioned before, the image group 404 and image group 405 were originally two complete pictures (or cards). However, due to some reading problems, the image group 405 turned out to be an incomplete image group. Through the second merging step of the invention, the image group 405 can be recovered back to a complete image object.

Figure 6A:
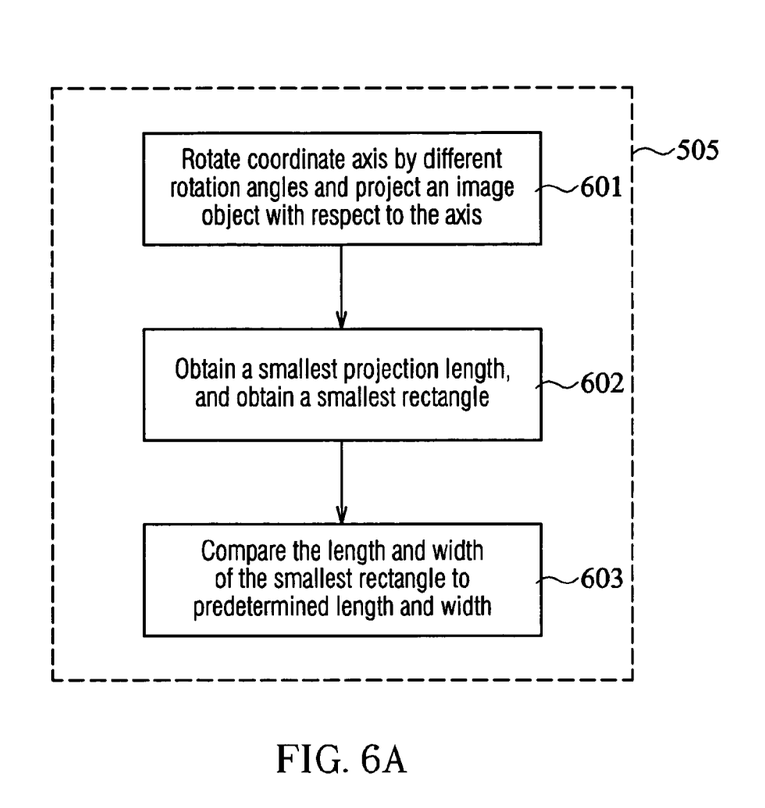
FIG. 6A is a flow chart illustrating a rotating-projecting step according to a preferred embodiment of the invention.
Figure 6B:
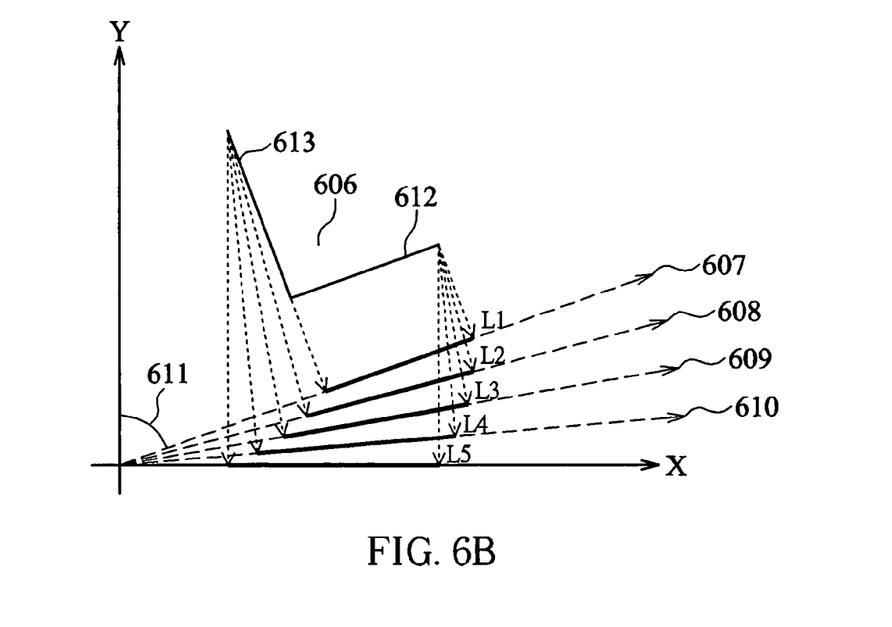
FIG. 6B is a schematic diagram illustrating a rotating-projecting step according to a preferred embodiment of the invention.

FIGS. 6A and 6B illustrates a preferred embodiment of a rotating-projecting step according to the invention, which is used to determine if merging is reasonable As shown in FIG. 6A, the projecting step includes: step 601, rotating coordinate axis by different angles and projecting an image object with respect to the axis, for example, the fifth group described above; step 602, obtaining a smallest projection length and a smallest rectangle; and step 603, comparing the length and width of the smallest rectangle to predetermined length and width, wherein if the length and width of the rectangle exceeds predetermined length and width, the merging is determined to be unreasonable, and if the length and width of the rectangle is equal to or smaller than predetermined length and width, the merging is determined to be reasonable.

The steps in FIG. 6A were described by way of FIG. 6B. Axes 607-610 represent coordinate axis rotated by different rotation angles. The width 612 of an image group 606 has different projection lengths L1-L5 in the axes 607-610, wherein the axis 607 parallel to the width 612 has the smallest projection length L1 (the same length as the width 612). Thus the length of the width 612 and the rotation angle 611 of the image object can be found. By using this method, not only the reasonability of merging of image objects can be determined but the rotation angle of image object can also be defined. Hence, even if an object is oblique due to displacement during scanning, the correction can still be made.

While the invention has been described by way of example and in terms of the preferred embodiment, it is to be understood that the invention is not limited to the disclosed embodiments. In other words, it is intended to include equivalent modifications and changes of the above embodiments without departing from the spirit and scope of the invention as would be apparent to those skilled in the art. For example, the invention is not limited to be applied on image objects obtained from the scanning of scanners only; it can also be applied on image objects obtained from cameras or other devices. Therefore, the scope of the appended claims should be accorded the broadest interpretation so as to encompass all such equivalent modifications and changes.

What is claimed is:

1. A method for automatically cropping image objects, including: using a processor to perform
    an object contour detecting step, for detecting the contour of image objects to generate a binary image by using Modified Laplacian Contour Detector;
    an image dividing step, for dividing the binary image into a background region and a plurality of non-background regions by using Connected Components Algorithm (CCA); and
    an image merging step, for merging the closer non-background regions from large to small into a plurality of image groups,
    wherein the object contour detecting step comprises:
    for every pixel point, subtracting the grayscale value of 8 adjacent pixel points from the grayscale value of the pixel point to obtain the grayscale value differences between the pixel point and the 8 adjacent pixel points;
    adding up all the grayscale value differences that are positive to obtain the sum of positive differences, and adding up all the grayscale value differences that are negative to obtain the sum of negative differences; and adjusting the grayscale value of the pixel point, such that the sign of the adjusted grayscale value is the same as that of the one having a larger absolute value among the sum of positive differences and the sum of negative differences, and the magnitude of the adjusted grayscale value equals the sum of the absolute values of the sum of positive differences and the sum of negative differences.

2. The method for automatically cropping image objects as described in claim 1, wherein the image merging step comprises:

a first merging step, for respectively merging the non-background regions whose distance between each other is smaller than a predetermined critical value into first groups; and a second merging step, for respectively merging the closer first groups from large to small into second groups.

3. The method for automatically cropping image objects as described in claim 2, wherein the image merging step further comprises:

determining whether each of the second groups is an image object.

4. The method for automatically cropping image objects as described in claim 2, wherein the second merging step comprises:

(a) labeling each first group as unprocessed;
(b) selecting a largest first group to be a third group;
(c) selecting another unprocessed first group to be a fourth group;
(d) merging the third group and the fourth group;
(e) executing a determination step, determining whether the merging of the third group and the fourth group is reasonable, wherein the determination step comprises:

merging the third group and the fourth group into a fifth group;

rotating coordinate axis and projecting the fifth group with respect to the axis; and obtaining an optimal rotation angle from different rotation angles, and a smallest rectangle, if the length and width of the rectangle do not coincident with predetermined length and width, the merging of the third group and the fourth group is unreasonable, otherwise the merging of the third group and the fourth group is reasonable;

(f) if the merging is reasonable, merge the fourth group with the third group, and delete the fourth group, thereafter return to step (c); if the merging is unreasonable, return directly to step (c), step (f) being continued until each of the first groups has been tried to merge with the third group; and (g) labeling the third group as processed, and returning to step (b), until every one of the first groups is processed.

5. A method for detecting image object contour, comprising: using a processor to perform for every pixel point, subtracting the grayscale value of 8 adjacent pixel points from the grayscale value of the pixel point to obtain the grayscale value differences between the pixel point and the 8 adjacent pixel points;

adding up all the grayscale value differences that are positive to obtain the sum of positive differences and adding up all the grayscale value differences that are negative to obtain the sum of negative differences; and adjusting the grayscale value of the pixel point, such that the sign of the adjusted grayscale value is the same as that of the one having a larger absolute value among the sum of positive differences and the sum of negative differences, and the magnitude of the adjusted grayscale value equals the sum of the absolute values of the sum of positive differences and the sum of negative differences.

* * * * *